United States Patent [19]

Rühl et al.

[11] Patent Number: 4,521,543

[45] Date of Patent: Jun. 4, 1985

[54] NON-FLAMMABLE RIGID FOAM AND ITS USE AS A BUILDING MATERIAL

[75] Inventors: Erich Rühl, Saalburgstrasse 65, 6382 Friedrichsdorf/Ts., Fed. Rep. of Germany; Johann Thenner, Pohlheim, Fed. Rep. of Germany

[73] Assignee: Erich Rühl, Fed. Rep. of Germany

[21] Appl. No.: 636,233

[22] Filed: Jul. 31, 1984

Related U.S. Application Data

[62] Division of Ser. No. 555,403, Nov. 28, 1983.

[30] Foreign Application Priority Data

Dec. 3, 1982 [DE] Fed. Rep. of Germany ....... 3244779

[51] Int. Cl.³ .............................................. C08J 9/14
[52] U.S. Cl. ..................................... 521/103; 521/85; 521/92; 521/106; 521/121; 521/124; 521/136; 521/181; 521/907
[58] Field of Search .................. 521/103, 85, 92, 106, 521/121, 124, 136, 181

[56] References Cited

U.S. PATENT DOCUMENTS 4,353,994 10/1982 Smith ................................. 521/181
4,419,460 12/1983 Ho ..................................... 521/181

*Primary Examiner*—Morton Foelak
*Attorney, Agent, or Firm*—Keil & Weinkauf

[57] ABSTRACT

The non-flammable rigid foam e.g. used as a building material complies with the requirements of DIN 4102 and which provides a non-toxicity of the combustion fumes according to DIN 53436. It has a mass ratio of resin component: filler of at least 1:2.5 and a bulk density amounting to 50 kg/m³ to 450 kg/m³. The resin component is formed by reaction of 50–62 mass parts resolic resin
0–15 mass parts furane resin
25–40 mass parts furfuryl alcohol
0.5–11.5 mass parts foam stabilizer including 14–17 mass parts per 100 mass parts of resin component plus filler of a curing agent mixture of phosphoric acid, boronhydrofluoric acid, p-toluene sulphonic acid and water. The filler used is a mixture of 40–55 mass % aluminium hydroxide
10–35 mass parts boric acid
2–7 mass parts sodium tetraborate
5–10 mass parts manganese dioxide
1–5 mass parts copper-II-oxide
1–4 mass parts magnesium hydroxysilicate
1–2 mass parts aluminium silicate.

4 Claims, No Drawings

NON-FLAMMABLE RIGID FOAM AND ITS USE AS A BUILDING MATERIAL

This is a division of application Ser. No. 555,403, filed Nov. 28, 1983.

BACKGROUND OF THE INVENTION

The present invention relates to a non-flammable rigid foam including filler material on the basis of phenolic resins and furane resins having a bulk density of 50 kg/m$^3$ to 450 kg/m$^3$ and which complies with the requirements according to DIN 4102 and DIN 53436 so that it can be used as a non-flammable building material.

Phenolic resin foam materials are manufactured already in nominal densities of 40 to 100 kg/m$^3$. Because of their comparatively high closed cell contents of about 75% they are used in buildings mainly as a thermal insulator. Such duroplastics foam materials, because of their 3-dimensional cross linkage are subjected in the event of fire primarily to carbonisation. The resulting carbon layer protects the underlying foam against further attack by flame and in addition this carbon layer in the event of pyrolysis gases catching fire, brings about an extinguishing of the flame.

The combustion performance is a process which takes place at the surface of the foam material, i.e. the extent of burning is determined by the surface area available, which in the case of foam materials having bulk densities as low as 40 kg/m$^3$ may be very large. As a consequence thereof the combustible material anywhere within the range of flames and radiation is pyrolysed almost totally. This is further promoted by a certain degree of closed cell characteristics and the low thermal conductivity resulting therefrom which creates a heat build-up. This lends additional support to the pyrolysis and the combustion process.

In the case of phenolic resin foams the thermal stability may be up to about 130° C. and for short durations up to 250° C. The emission of volatile gases commences at 270° C. and these may briefly burn when exposed to an open flame. As from 400° C. only glimmering is to be observed which is caused by oxidation processes at the surface of the solid carbon resins. The addition of boric acid to phenolic resins acts as a flame protector. However, since boric acid is a slow acting curing agent, the shelf life of the phenolic resin is limited to 24 hours, wherefore the addition of boric acid as a flame protecting agent to phenolic resin mixtures results in processing difficulties, more particularly in that the addition is possible only immediately prior to processing.

J. Troitsch in Kunststoffe 69/9; page 558–561 (1979) points out that only few inorganic compounds exist which are suitable for use as a flame protecting agent in plastics. Aluminium hydroxide and boron-containing compounds are employed for this purpose since they can be incorporated in plastics.

J. Greber and D. J. Braun describe in Plastverarbeiter 33/1; page 43–46 (1982) that aluminium hydroxide can be used as flame retarding filler for unsaturated polyester resins. In order to produce building components which when subjected to fire testing according to DIN 4102 are classified in Class B1 (flame resistant), filler contents of more than 55 mass % are needed. However, the need for such high filler contents results in substantial processing problems which can be overcome only partly by the use of special aluminium hydroxides. Since the fire performance of materials depends not only on their contents of flame protecting agents in the mixture, but also on the design configuration of the testing bodies, the provision of unsaturated polyester resins with aluminium hydroxide as a flame protection agent creates more problems than the fire-proofing with conventional halogen-antimony systems.

A non-flammable material which does not evolve toxic fumes is known from DE-OS No. 28 25 295 on the basis of phenolic resins and furfuryl alcohol. The material comprises 62–66 mass % aluminium oxide or aluminium hydroxide as an inorganic filler and may in addition contain up to 3 mass % finely divided silicic acid and other components. A closed or rigid foam having a bulk density of 500 g/l can be produced by the addition of a bloating agent.

However, the material suffers from a number of disadvantages.

Because of the use of organic sulpho acids as a single component in the curing agent system, the cured finished product is hygroscopical and is moreover, as a result thereof subject to a prolonged final curing period.

It was found that due to the high density the final curing period for the attainment of the ultimate strength amounts to several weeks. Morever, this material is highly corrosive in respect of metallic surfaces.

Due to the high viscosity of the reaction mixture a substantial non-homogeneous foam mixture results from foaming.

Moreover, when exposed to fire, the content of sulphur dioxide in the smoke or pyrolysis gas is still very high.

DESCRIPTION OF THE INVENTION

It is an object of the present invention to provide a rigid foam having a bulk density below 500 kg/m$^3$ which in fire conditions releases no toxic or corrosive gases, the mechanical and insulating properties of which permit its use in the building field and which complies with the requirements of class A 2 (non-flammable) when subjected to fire testing according to DIN 102.

According to the invention there is provided a non-flammable rigid foam on the basis of phenolic resin and furane resin, containing aluminium hydroxide as a filler, the resin component being formed by reaction of phenolic resin, furfuryl alcohol and a sulpho acid as curing agent, wherein the mass ratio of resin substance:filler substance is at least 1:2,5 and up to 1:3,2 and the bulk density is from 50 kg/m$^3$ to 450 kg/m$^3$ and the resin compound is the reaction product obtained by the reaction with one another of 50–62 mass parts resolic resin
0–15 mass parts furanic resin
25–40 mass parts furfuryl alcohol
0.5–1.5 mass parts foam stabiliser including 14–17 parts by mass per 100 parts by mass of resin component+filler substance of a curing agent mixture composed of 40–50 mass parts phosphoric acid
12–17 mass parts boron hydrofluoric acid
6–7 mass parts p-toluene sulphonic acid or p-phenol sulphonic acid and
32–35 mass parts water.

The rigid foam according to the invention which comprises aluminium hydroxide, as a filler is composed of a resin component and a filler component, the mass ratio of resin material:filler material being at least 1:2,5 and the bulk density being 50 kg/m$^3$ to 450 kg/m$^3$.

The resin component is obtained by reacting 50–62 mass parts resolic acids, 0–15 mass parts furane resin, 25–40 parts furfuryl alcohol, 0.5–5 mass parts foam stabiliser, jointly with the filler, with 14–17 mass parts per 100 mass parts of resin component plus filler, of a curing agent mixture comprising 40–50 mass parts phosphoric acid, 12–17 mass parts boron hyrofluoric acid, 6–7 mass parts p-toluene sulphonic acid and 32–35 mass parts of water.

For making the resin component a resolic resin, i.e. a precondensate of phenol and formaldehyde having an average molecular weight of 500 and a precondensate of furfuryl alcohol and furfuryl aldehyde, jointly with additional furfuryl alcohol are caused to react with a curing agent mixture. The curing process which is an exothermal reaction commences after an adjustable starting-up period. The amount of heat evolved is sufficient to evaporate a bloating agent (foaming agent), e.g. fluorinated hydrocarbons sufficiently to create the desired foam texture. The bloating agent may be added to the resin component in the event of a constant formulation for a constant bulk density, or it is added as an additive during actual mixing of the resin precursors and the curing agents mixture.

The addition of suitable fillers causes the liberation of the volatile pyrolysis products in the event of fire even below the ignition temperature. For that purpose it was found necessary to have a ratio of resin material to inorganic fillers of 1:2.5 in order to attain the non-flammability according to DIN 4102. Higher filler contents up to a ratio of 1:3.20 are possible in principle, care having to be taken, however, that the viscosity does not increase too much and inhibits the foam formation.

The pyrolysis products which are liberated on exposure to fire, may be rendered harmless in the context of subsequent fire hazards by a variety of combinations of the fillers.

Because of the low bulk density of a foam material as compared with a solids body, less combustible substance is made available per unit of volume. On the other hand, a larger region of the foam body, depth-wise starting from the surface is exposed to the fire due to the enlargement of the surface area because of the numerous cells of the plastic foam. However, this enlargement of the active internal surface area may be utilised in order to oxidise the pyrolysis products arising during fire exposure to such an extent that they either are no longer flammable or the formation of carbon monoxide is prevented substantially.

The main component of the inorganic filler mixture is an aluminium hydroxide, preferably having a definite particle size distribution. This is desirable, because of the size of the active surface area of this filler is variable, it may happen that it is inadequately wetted by the resin such that the coherence in the fully cured condition is inadequate. Finally, the viscosity of the mixture of resin ingredients and filler may become too high for processing.

The best suited aluminium hydroxide has screen analysis characteristics complying with total screen passing values 25% 5.5 μm
50% 52.0 μm
75% 80.0 μm Other particle size distributions may also be used provided the particles have a suitable particle shape, for example preferably spherical.

The effect of the aluminium hydroxide as a flame protectant resides not only in a dilution of the system, but also in a purely physical effect. In an endothermal process exposure to fire results in the liberation of water which in turn causes dilution of the combustible pyrolysis products and simultaneous cooling with reduction of the heat transfer into the deeper foam regions.

In order to counteract the processing problems which may result from too high viscosities of the material prior to foaming when the aluminium hydroxide contents are very high, the invention provides for parts of the aluminium hydroxide to be replaced by other substances, i.e. to use a mixture of fillers.

The amounts of filler additives in mass %, based on total amounts of filler and resin components are:

40–55 mass % aluminium hydroxide
2–7 mass % sodium tetraborate
10–35 mass % boric acid
1–5 mass % copper-II-oxide
5–10 mass % manganese dioxide
1–4 mass % magnesium hydroxy silicate
1–2 mass % aluminium silicate.

In this context a ratio of borate:boric acid of 1:5 is to be maintained. The boric acid is used only in the form of a mixture with sodium tetraborate since in the absence of the borate the curing process would proceed prematurely.

The use of boron compounds as filler substances offers the advantage that on exposure to fire initially a step-wise release of water as part of an endothermal reaction takes place with the formation of boric acid anhydrides. The resin pore skeleton is protected by a glass-like coating because boric acid anhydride softens at approximately 350° C. and becomes fluid from 500° C. onwards. Eventually, due to acid catalysed water removal from the organic substance a dehydratisation takes place which results in an increased carbonisation of the resin content.

The addition of copper oxide and manganese oxide as oxydising agents to the filler has the effect that functional groups of the resin during the entire progress of the hardening process are converted oxidatively, cyclisation and condensation resulting in products rich in carbon. These, when exposed to fire, promote carbonisation and then protect the resin phase underneath the actual flame zone. In addition, carbon monoxide already formed in the closed cell foam structure underneath the carbonisation zone is oxidised into carbon dioxide (reduction of the toxicity).

Further inorganic additives such as magnesium hydrosilicates or hydrous aluminium silicates, e.g. bentonite serve the purpose to either react with the inorganic curing agent components or to bind water which is added or which is formed during the condensation.

The curing agent mixture is composed predominantly of inorganic acids with a small content of p-toluene sulphonic acid or p-phenol sulphonic acid. The exclusive use of organic sulphonic acids is disadvantageous since in the case of exposure to fire or the effect of pyrolysis temperatures (300°–500° C.) any sulphurdioxide formed thereby will result in an increased formation of carbon monoxide in the pyrolysis gas equilibrium.

Having regard to a favourably timed incipient reaction (commencement time, rising period of the foam) and minimum amounts of added curing agent, the following acid combinations: were found to be particularly suitable as curing agents:

| 100% phosphoric acid mass % | 100% boron hydrofluoric acid mass % | 100% paratoluene sulphonic acid or para-phenol sulphonic acid, mass % | Water mass % |
| --- | --- | --- | --- |
| 41,5 | 17 | 6,9 | 34,6 |
| 45,9 | 14,3 | 6,6 | 33,2 |
| 49,0 | 12,2 | 6,6 | 32,2 |

The use of phosphoric acid in the curing catalyst, besides having a hydrogen ion donor function has the following effect:

On exposure to fire the phosphoric acid acts in a manner similar to boric acid with regard to the reactions proceeding in the resin phase. Polymeric phosphoric acid is formed which due to the formation of a glassy coating over the carbonaceous pore structure already formed inhibits pyrolysis. This shielding against the attack of oxygen and heat radiation is resistant to high temperatures. The formation of phosphides which have a strongly reducing effect inhibits the formation of CO and $CO_2$ in favour of carbon formation. The so-called post-glimmering, caused by the oxidation of the carbon into CO and $CO_2$ is restricted.

The use of boron hydrofluoric acid also effects an improvement of the non-flammability of the foam material. The fluoroborates formed with the filler substances become effective in the case of fire by their liberation of boron trifluoride in the gas phase.

The rigid foam system according to the invention is a dual component system of a resin component and a filler (component A) and a curing agent (component B), and the bloating agent can be admixed either to component A or may be introduced as a component C immediately prior to processing.

Lower chlorofluoro hydrocarbons, e.g. trifluoromonochloromethane or trichlorotrifluoroethane and also n-pentane, all having a boiling point in the range of about 24° C. to 48° C. are suitable as bloating agents. When replacing one bloating agent (trichlorotrifluoroethane) by another of the abovementioned substances, the amount introduced must be divided by a factor: Replacement of trichlorofluoroethane (F=1)

by n-pentane: F=2.6
by trifluoromonomethane: F=1.8

Thus a predetermined bulk density may be maintained whenever one bloating agent is replaced by another.

According to experience the flammable n-pentane has no affect on the non-flammability of the foam material.

A further possibility of attaining a bloating effect resides in the injection of compressed air into the pre-mixing chamber of the intensive mixer when processing the components. This so-called "nuclearisation air" due to its forming nuclei promotes the bloating process in the presence of bloating agents; but it may even produce a foam structure without bloating agents.

The rigid foam according to the invention thus represents a complex reaction mixture within which even after the mixing of the components A and B additional fire inhibiting substances are formed. Moreover, in the event of fire exposure further reactions take place step by step as the temperature rises which similarly counteract an ignition of the foam material.

The rigid foam according to the invention in view of its mechanical strength represents a non-flammable building material which can be used as premanufactured components or for foam application in situ. The composition according to the invention permits the attainment of bulk densities between 50 kg/m³ and 450 kg/m³. In the event of bulk densities up to 150 kg/m³ a non-flammable hard foam having very good thermally insulating properties is formed. Bulk densities between 200 and 450 kg/m³ result in load-bearing building components. Accordingly the bulk density of the foam according to the invention is preferably adjusted within the range of 70 kg/m³ to 300 kg/m³. If a particularly high fire resistant class is desired combined with increased mechanical strength, bulk densities between 150 kg/m³ and 250 kg/m³ were found to be particularly suitable.

The rigid foam according to the invention in the case of usual design configurations complies with the requirements of class A 2 in the fire resistance test in a fire shaft according to DIN 4102. As required by this DIN specification, no toxic gases are formed in the case of fire.

The curing agent composition according to the invention results in a residual acid content so low that no corrosion effects whatsoever arise from bonding the foam to metallic screening panels.

Similarly with rigid foam systems according to the invention the hygroscopy experienced with similar systems is greatly reduced.

The employment of precondensed furane resin in the resin component permits an improved regulation of the reactivity and extends the rising period of the foam. In addition the strength of the cellular structure is improved.

If instead of conventional foam stabilisers pyrogenic silicic acid is used as a thixotropic additive, the pore structure may be regulated particularly well.

The advantage of the addition of copper oxide and manganese oxide as oxidizing agent resides, as stated above, in that during the curing phase reactions with the functional terminal groups of the resin components take place. In the event of fire this results in a decrease of the formation of carbon monoxide in the closed cell pore structure and thus in a reduction of the toxicity of the combustion gases.

The addition of magnesium hydroxy silicate and aluminium silicates makes possible reactions with the anions of the curing system, causing these to be bound.

Phosphoric acid and boronhydrofluoric acid in the curing agent system serve as hydrogen ion donors for condensing the resin system. The phosphates formed at the same time act as further flame protectors. The system is manufactured ready for use as a two component system. The component A comprises the resin component and the filler, the component B comprises the curing agent. As previously stated, the bloating agent may be admixed to the component A or be introduced as a further component C during mixing of the components A and B. The preferred composition of the resin component comprises a mixture of 56.6 mass % resolic resin
29.9 mass % furfuryl alcohol
12.6 mass % furane resin
0.9 mass % foam stabiliser.

If in the case of certain mixtures of filler substances retardation of the start of the reaction after the addition of the curing agent is experienced and an increased reactivity of the resin component is desired, the following composition is found to be particularly suitable:

60.3 mass % resolic resin
38.8 mass % furfuryl alcohol
0.9 mass % foam stabiliser.

The range of use of the rigid foam according to the invention is very wide, it being suitable particularly as a non-flammable building material. Premanufactured components may be manufactured therefrom such as panels, half shells, pipe jacketings. It is also possible to manufacture foam panels continuously laminated with foils or sheet metal on so-called dual band machines. The two component system may, however, also be used for injecting foam into cavities in situ as is desired for example in the context of services ducts or airconditioning ducts.

Premanufactured panels were subjected to preliminary testing according to DIN 4102 and DIN 5346. DIN 4102 was directed at the fire hazard testing in a fire shaft or to kiln testing. DIN 53436 relates to the smoke and pyrolysis gas evolution in fire situations. The following results were attained in the above:

maximum temperature increase in the kiln at 750° C., average of three measurements: 32° C. (maximum permitted value: +50° C.).

In the fire shaft
the flame level amounted to 50 cm (maximum limit 65 cm)
residual length: 40 cm (limiting value 35 cm)
flue gas temperature: 105° C. (limit 125° C.)
flue gas density: very low, no after burning, no after glimmering
Flue gas density: XP2 chamber 2% (limiting value 15%)
Pyrolysis gases according to DIN 53436, 0.01% by volume (upper limit 0.04% by volume).

DESCRIPTION OF SPECIFIC EMBODIMENTS

Example 1

| A-component: (resin and filler) | phenol resol | 15,3 mass % |
|---|---|---|
| | furfuryl alcohol | 8,1 mass % |
| | furane resin | 3,4 mass % |
| | stabiliser | 0,25 mass % |
| | copper oxide | 4,2 mass % |
| | water | 4,5 mass % |
| | aluminium hydroxide | 55,0 mass % |
| | manganese dioxide | 7,25 mass % |
| | magnesiumhydroxy silicate | 2,0 mass % |
| | | 100,0 mass % |

Reaction mixture:

| 100 mass parts | A components |
|---|---|
| 2 mass parts | bloating agent (trichlorotrifluoroethane) |
| 17 mass parts | curing agent 41,5 mass % phosphoric acid mixture |
| | 17,0 mass % boronhydrofluoric acid |
| | 6,9 mass % p-toluene sulphonic acid |
| | 34,6 mass % water |

After intensive mixing a rigid foam is attained having a bulk density below 100 kg/m$^3$.

The starting period is 30 seconds, the rising period 2 min. 15 seconds. The temperature of the foam rises to about 90° C.

Example 2

| A-component: | phenol resol | 16,3 mass % |
|---|---|---|

-continued

| (Resin and filler) | furfuryl alcohol | 10,5 mass % |
|---|---|---|
| | stabiliser | 0,25 mass % |
| | copper oxide | 1,0 mass % |
| | water | 4,95 mass % |
| | aluminium hydroxide | 48,0 mass % |
| | sodium tetraborate | 2,5 mass % |
| | boric acid | 12,5 mass % |
| | magnesium hydroxy silicate | 4,0 mass % |
| | | 100,0 mass % |

Reaction mixture:

| 100 mass parts | Component A |
|---|---|
| 3 mass parts | bloating agent (trifluoromonochloromethane) |
| 14 mass parts | curing agent mixture 49 mass % sulphuric acid |
| | 12,2 mass % boronhydrofluoric acid |
| | 6,6 mass % p-toluene sulphonic acid |
| | 32,2 mass % water |

This batch results in a rigid foam having a bulk density of about 100 kg/m$^3$. By increasing the bloating agent content to 5 mass parts, the bulk density can be reduced to 80 kg/m$^3$.

Starting period: 60 seconds
Rising period: 120 seconds
Maximum reaction temperature: 75° C.

Example 3 results in a rigid foam of clearly increased compressive strength. In addition the carbon monoxide content of the pyrolysis gases is reduced about 2½ fold in relation to the limit value permitted according to the DIN testing method.

Example 3

| A component (resin and filler) | phenol resol | 16,3 mass % |
|---|---|---|
| | furfuryl alcohol | 10,5 mass % |
| | stabiliser | 0,25 mass % |
| | copper oxide | 2,0 mass % |
| | water | 4,95 mass % |
| | aluminium hydroxide | 22,0 mass % |
| | sodium tetraborate | 7,0 mass % |
| | boric acid | 35,0 mass % |
| | magnesium hydroxy silicate | 1,0 mass % |
| | | 100,0 mass % |

Reaction mixture:

| 100 mass % | A component |
|---|---|
| 3 mass % | bloating agent (mixture of equal parts of trichlorotrifluoroethane and trifluoromonochloromethane) |
| 17 mass % | curing agent mixture 45,9 mass % phosphoric acid |
| | 14,3 mass % boronhydrofluoric acid |
| | 6,6 mass % p-toluene sulphonic acid |
| | 33,2 mass % water |

This batch when mixed yields a rigid foam having a bulk density of 150 kg/m$^3$. If instead of the aforesaid curing agent that according to Example 1 is used, the bulk density can be lowered to about 100 kg/mg$^3$.

Reaction temperature with the stated curing agent: 70° C., which increases to 90° C. if the curing agent according to Example 1 is used.

Starting-up period: 120 seconds

Bloating period: up to 3 minutes.

Example 4

This formulation differs from the previous example by the substantially increased reactivity of the resin system (exothermal heat generation) and is accordingly suitable particularly for foam injections "in situ". This type of foam injection is practised particularly in buildings where cable or services shaft passages are to be sealed.

A thixotropic effect is attained by the addition of colloidal silicic acid, i.e. the reaction mixture immediately after leaving the mixer is still of very low viscosity, but subsequently becomes more viscous and no longer flows so readily. However, the bloating process is not inhibited; in this context the aforesaid increased activity is particularly important.

|  |  |
| --- | --- |
| phenol resol | 16,3 mass % |
| furfuryl alcohol | 10,5 mass % |
| colloidal silicic acid | 0,25 mass % |
| copper oxide | 5,0 mass % |
| water | 4,95 mass % |
| aluminium hydroxide | 50,0 mass % |
| manganese dioxide | 10,0 mass % |
| magnesiumhydroxy-silicate | 2,0 mass % |
| aluminiumsilicate | 1,0 mass % |
|  | 100,0 mass % |

Reaction mixture:

|  |  |
| --- | --- |
| 100 mass parts | A components |
| 3 mass parts | bloating agent |
| 17 mass parts | curing agent mixture of Example 1. |

The bulk density depends considerably on the foam geometry. Smaller volumes, such as volumes of 10–14 l result in higher bulk densities since the heat transfer into the adjoining wall regions can be substantial. Components of larger volumes such as several hundred liters will yield correspondingly lower bulk densities. This can be regulated from case to case by applying different dosages in the curing agent mixture.

Comparative Example (according to Example 4 of DE-PS No. 28 25 295 with 500 kg/m³ bulk density).

Composition of the system

|  |  |
| --- | --- |
| phenolic resin | 12,8 mass % |
| furfurylalcohol | 12,8 mass % |
| Ethanol | 1,3 mass % |
| Butanol | 1,3 mass % |
| butylglycol | 1,9 mass % |
| paraformaldehyde | 1,9 mass % |
| epoxy resin | 0,4 mass % |
| polyester resin | 0,3 mass % |
| aluminiumhydroxide | 64,3 mass % |
| fibres | 0,4 mass % |
| $SiO_2$ | 2,6 mass % |
|  | 100,0 mass % |

The ratio of organic substances/inorganic substances amounts to 1:2.06, a figure which by experience yields substantially higher heater values as those permitted according to DIN 4102 for non-flammability.

If the same ratio is determined in the fully cured state, this value even changes to 1:1.60.

Samples practised according to that recipe produce viscosity values which in view of the extremely high viscosity of the so-called A component produce foams of bulk density close on 500 kg/m³ with difficulty.

Moreover, when exposed to pyrolysis temperature, very much sulphur dioxide is evolved—so much that in the condensate (water) in the cooling pipe of the pyrolysis apparatus (DIN 53 436) an excessive acid reaction is to be observed.

This high sulphur dioxide content in the pyrolysis gas is also the cause for the measured CO concentrations in the inhalation chamber (rat test). This in the example here given amounted to 0.13 volume %. The permitted maximum is 0.04 volume %.

This pyrolysis gas is accordingly to be considered quite toxic.

The comparative example demonstrates the drawbacks of the prior art material particularly clearly.

All rigid foams produced according to the aforesaid examples prior to loading require a curing period of about 7 days. The complete hardening throughout of the cellular structure by cross linking is assured only then.

The batches described in the examples can be processed with conventional component dosage and mixing machines since the viscosity of the liquid system according to the composition of the invention as compared with known systems having higher filler contents is lower.

The following claims are to be considered an integral part of the disclosure.

We claim:

1. A non-flammable rigid foam on the basis of phenolic resin and for furane resin, containing aluminium hydroxide as a filler, the resin component being formed by reaction of phenolic resin, furfuryl alcohol and a sulpho acid as curing agent, wherein
    the mass ratio of resin substance: filler substance is at least 1:2,5 and up to 1:3,2 and the bulk density is from 50 kg/m³ to 450 kg/m³ and the resin compound is the reaction product obtained by the reaction with one another of
    50–62 mass parts resolic resin
    0–15 mass parts furanic resin
    25–40 mass parts furfuryl alcohol
    0.5–1.5 mass parts foam stabiliser
    including 14–17 parts by mass per 100 parts by mass of resin component+filler substance of a curing agent mixture composed of
    40'–50 mass parts phosphoric acid
    12–17 mass parts boron hydrofluoric acid
    6–7 mass parts p-toluene sulphonic acid or p-phenol sulphonic acid and
    32–35 mass parts water.

2. A non-flammable rigid foam according to claim 1, wherein
the filler substance is composed of
    40–55 mass parts aluminium hydroxide
    10–35 mass parts boric acid
    2–7 mass parts sodium tetraborate
    5–10 mass parts manganese dioxide
    1–5 mass parts copper-II oxide
    1–4 mass parts magnesium hydroxide silicate
    1–2 mass parts aluminium silicate
    the ratio of borate:boric acid being 1:5.

3. A non-flammable rigid foam according to claim 1 wherein
the foam stabiliser is pyrogenic silicic acid.

4. A non-flammable rigid foam according to claim 1, wherein
the aluminium hydroxide has a screen analysis curve according to the following screen passing data
25% 5.5 μm
50% 52.0 μm
75% 80.0 μm.

* * * * *

UNITED STATES PATENT AND TRADEMARK OFFICE
CERTIFICATE OF CORRECTION

PATENT NO. : 4,521,543

DATED : June 4, 1985

INVENTOR(S) : Erich RUHL et al.

It is certified that error appears in the above-identified patent and that said Letters Patent is hereby corrected as shown below:

Column 10, line 42 "1:2,5 and up to 1:3,2" should read --1:2.5 and up to 1:3.2--; and line 53, "40'-50" should read --40-50--.

Signed and Sealed this

Fifteenth Day of October 1985

[SEAL]

Attest:

DONALD J. QUIGG

Attesting Officer

Commissioner of Patents and
Trademarks—Designate